United States Patent [19]

Hougaard

[11] Patent Number: 4,887,126
[45] Date of Patent: Dec. 12, 1989

[54] REPRODUCTION CAMERA

[75] Inventor: Finn Hougaard, Copenhagen, Denmark

[73] Assignee: Eskofot, Ballerup, Denmark

[21] Appl. No.: 181,527

[22] Filed: Apr. 14, 1988

[30] Foreign Application Priority Data

Apr. 24, 1987 [DK] Denmark ............................ 2110/87

[51] Int. Cl.$^4$ ............................................ G03B 27/62
[52] U.S. Cl. ..................................... 355/75; 355/113; 355/133
[58] Field of Search .................. 355/3 TR, 16, 75, 76, 355/113, 133

[56] References Cited

U.S. PATENT DOCUMENTS

| 3,672,758 | 6/1972 | MacDonald, Jr. | 355/3 R |
| 3,677,640 | 7/1972 | Nakatani et al. | 355/113 X |
| 3,888,586 | 6/1975 | Arden et al. | 355/133 X |
| 4,474,457 | 10/1984 | Phelps | 355/75 X |

FOREIGN PATENT DOCUMENTS

| 1221777 | 2/1971 | United Kingdom . |
| 2038502 | 7/1980 | United Kingdom . |
| 2086689 | 5/1982 | United Kingdom . |
| 2099181 | 12/1982 | United Kingdom . |

OTHER PUBLICATIONS

"Neblette's Handbook of Photography and Reprography", pp. 24, 25, 494 and 495.

Primary Examiner—Richard A. Wintercorn
Attorney, Agent, or Firm—Cushman, Darby & Cushman

[57] ABSTRACT

A reproduction camera comprising an original plane, an objective plane, and a picture plane, a raster, a film, and a preferably transparent recording sheet being situated on a glass plate in the picture plane, and a rubber cover optionally being situated on the recording sheet during a reproduction. The recording sheet is preferably adhered along one side to the glass plate therebelow. Static electricity may, however, occur when a rubber cover in a pivotably mounted lid has been pressed towards the adhered recording sheet and is subsequently opened. The attractive force between the cover and the recording sheet caused by the charge may become so strong that the recording sheet follows the lid when said lid is opened. In addition the operator can be subjected to electric shocks. These problems have according to the invention been solved by the preferably transparent recording sheet being made electrically conductive, and by discharging the recording sheet when the rubber cover is removed from said recording sheet.

7 Claims, 3 Drawing Sheets

REPRODUCTION CAMERA

FIELD OF THE INVENTION

The invention relates to a reproduction camera comprising an original plane, an objective plane, and a picture plane, a raster, a film, and a preferably transparent recording sheet being situated on a glass plate in the picture plane, and a rubber cover optionally being situated on the recording sheet during a reproduction.

BACKGROUND ART

The recording sheet is preferably adhered along one side to the glass plate therebelow. Static electricity may, however, occur when a rubber cover in a tiltable lid has been pressed towards the adhered recording sheet and is subsequently opened. The attractive force between the cover and the recording sheet caused by the charge may become so strong that the recording sheet follows the movement of the lid when said lid is opened. In addition the operator can be subjected to electric shocks. Previous attempts to solve these problems have not been successful.

SUMMARY OF THE INVENTION

The principal object of the present invention is to provide a new and improved reproduction camera.

A further object of the present invention is to provide a reproduction camera without attraction between the lid and the recordingsheet.

A still further object of the present invention is to provide a reproduction camera where the operator is not subjected to electric shocks.

In satisfaction of the foregoing objects there is according to the invention provided a preferably transparent recording sheet which is made electrically conductive, and the conductive sheet is discharged when the rubber cover is removed from the recording sheet. In this manner the electrostatic charges are avoided in the recording sheet. Furthermore it is ensured both that the recording sheet does not follow the lid when the rubber cover is opened, and that the operator is not subjected to electric shocks. A further advantage is that the vulnerable semiconductor circuits, such as MOS circuits, in associated computers are not damaged. A still further advantage is that dust is not attracted to the picture plane.

The means discharging the recording sheet may for instance be an earth connection. As an alternative the recording sheet may be connected to a rubber cover made electrically conductive.

According to a particularly preferred embodiment the recording sheet is only electrically conductive on the surface, a pattern of conducting paths of optically absorptive material being applied thereto. As a result the recording sheet is suitable for the purpose aimed at without the pattern being included during the reproduction.

BRIEF DESCRIPTION OF DRAWINGS

In order that the present invention may be readily carried into effect it will now be described with reference to the accompanying drawings, in which.

DESCRIPTION OF PREFERRED EMBODIMENTS

Figure 1:
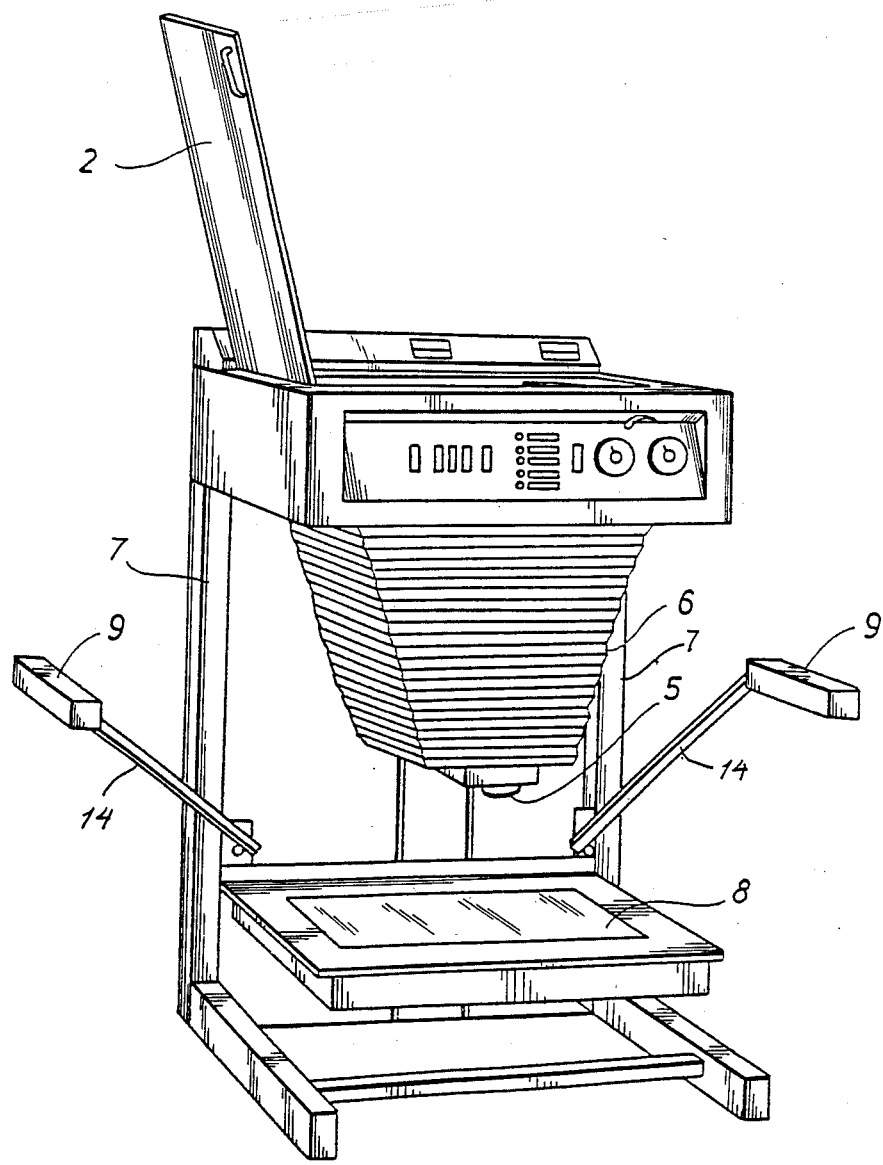
FIG. 1 illustrates a reproduction camera according to the invention.

The inventive reproduction camera of FIG. 1 comprises a frame. At the top this frame carries a permanent table with a glass plate 1, on which a sheet of light-sensitive material can be placed. A lid 2 can be placed on the glass plate 1 so as to keep the sheet 4 in position. A photographic objective 5 is carried by an up- and downwardly displaceable bellows 6. A table 8 is situated below the objective 5 and is mounted in two vertical guides 7. The table 8 can be moved up- and downwards, i.e. towards and away from the objective 5. This table 8 supports a glass plate on which an original can be placed. Illuminating means 9 situated on pivotal arms 14 are adapted to expose the original on said table 8.

Figure 2:
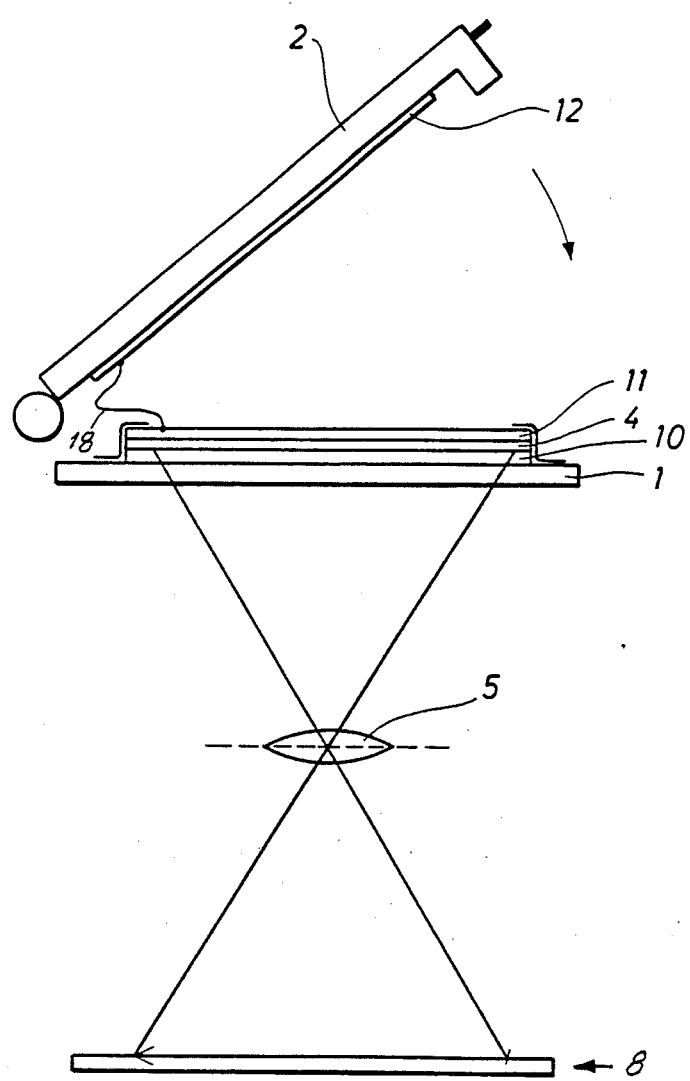
FIG. 2 illustrates how a cover can be tilted down to the picture plane.

The glass plate 1 in the picture plane usually includes a raster 10, a film 4, and a recording sheet 11. The recording sheet 11 is usually adhered to the glass plate 1 by means of tape. Static electricity may, however, occur when a covering rubber cover 12 in a pivotally mounted lid has been pressed towards the recording sheet 11 and is subsequently opened, cf. FIG. 2. The attractive force between the lid 2 and the recording sheet 11 caused by the charges can thereby become so strong that the recording sheet 11 follows the movement of the lid 2 when said lid is opened.

According to the invention the rubber cover 12 in the lid 2 is made conductive like the surface of the recording sheet 11, said lid being electrically connected to the frame 7. Alternatively the rubber cover 12 can be electrically connected to the recording sheet 11 by means of a conductor 18. In this manner the recording sheet 11 is automatically discharged when the lid 2 is opened. In addition the operator is not subjected to electric shocks.

Figure 3:
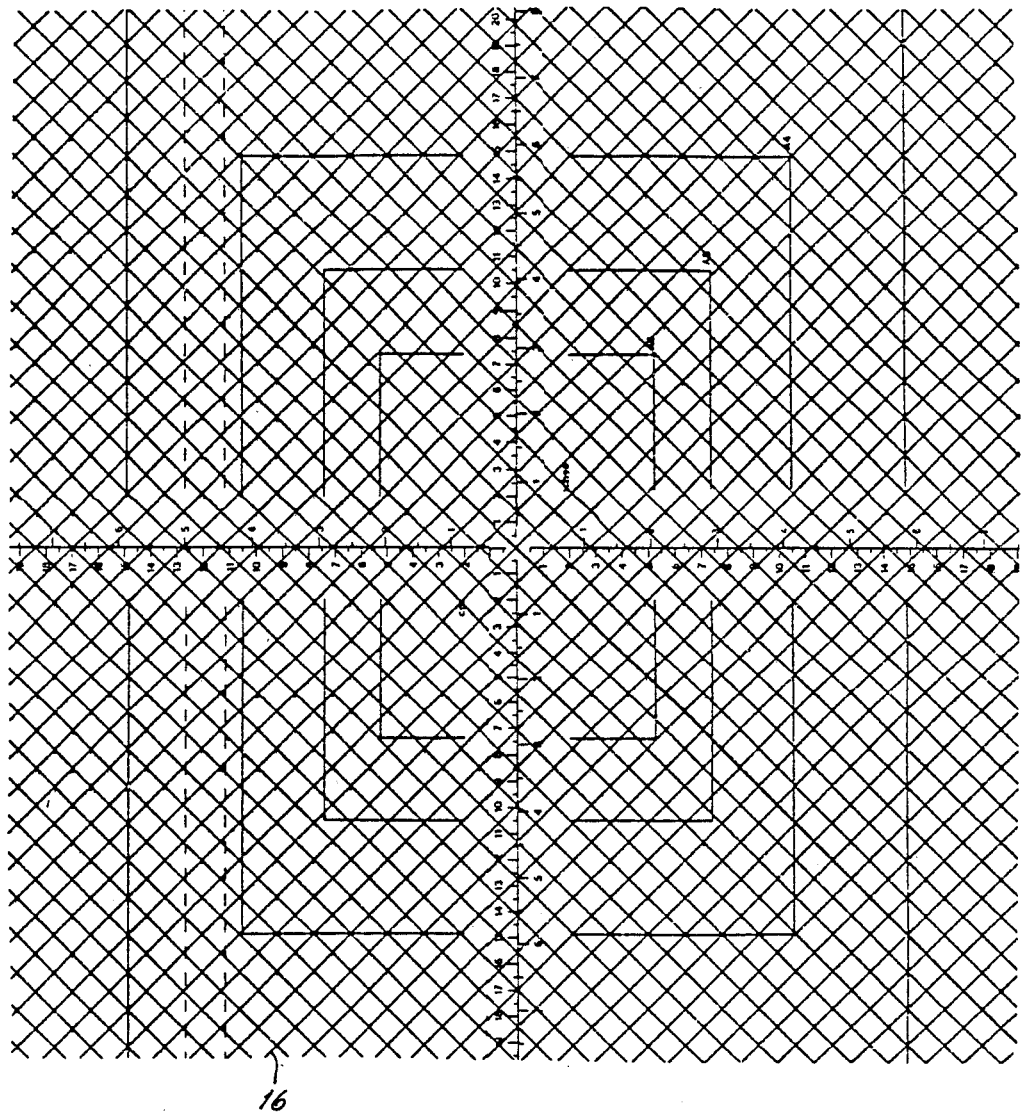
FIG. 3 illustrates a recording sheet situated in the picture plane.

The charging capacity of the recording sheet 11 is provided by means of conductive paths 16 of silver admixed with carbon, cf. FIG. 3. Carbon is capable of absorbing light in such a manner that the pattern of conductive paths 16 on the surface of the recording sheet 11 is not reproduced in the picture.

According to an alternative embodiment the recording sheet 11 is instead electrically connected to the earth. In this case too the recording sheet 11 is automatically discharged when the lid 2 is opened. In this manner it is ensured that the recording sheet 11 does not follow the movement of the lid 2 when said lid is opened, and that the operator is not subjected to electric shocks. In addition it is also possible to avoid damages of vulnerable semiconductor circuits in associated computers, such as MOS circuits, which are very sensitive to static electricity. A still further advantage is that the attraction of dust to the picture plane is omitted. As a result the quality of the pictures is increased.

According the invention it has thus been shown how it is possible to achieve a reproduction camera by way of simple and inexpensive means, said reproduction camera being considerably improved compared to the previously known cameras.

While the invention has been described by means of specific examples and in specific embodiments we do not wish to be limited thereto, for obvious modifications will occur to those skilled in the art without departing from the spirit and scope of the invention.

I claim:

1. A reproduction camera comprising an original plane, an objective plane, and a picture plane, a raster, a film, and a preferably transparent recording sheet being situated on a glass plate in the picture plane, and a rubber cover optionally being situated on the recording sheet during a reproduction, wherein the preferably transparent recording sheet (11) is electrically conductive.

2. A reproduction camera as in claim 1, wherein means are provided which discharge the recording sheet when the rubber cover (12) is removed from the recording sheet.

3. A reproduction camera as in claim 2, wherein the electrically conductive recording sheet (11) is connected to earth.

4. A reproduction camera as in claim 2, wherein the rubber cover (12) is electrically conductive and is electrically connected to the recording sheet (11).

5. A reproduction camera as in claim 1, wherein the recording sheet (11) is only electrically conductive on the surface.

6. A reproduction camera as in claim 5, wherein the recording sheet on the surface comprises a pattern of conductive paths of an optically absorptive material, said pattern being excluded during the reproduction (FIG. 3).

7. A reproduction camera as in claim 6, wherein the optically absorptive material is a mixture of silver and carbon.

* * * * *